United States Patent [19]

Reimann

[11] Patent Number: 4,560,067
[45] Date of Patent: Dec. 24, 1985

[54] THERMOPLASTIC BAG PACK

[75] Inventor: George J. Reimann, Pittsford, N.Y.

[73] Assignee: Mobil Oil Corporation, New York, N.Y.

[21] Appl. No.: 634,089

[22] Filed: Jul. 25, 1984

[51] Int. Cl.$^4$ ............................ B65D 1/34; B65D 6/04
[52] U.S. Cl. ................................... 206/554; 206/526; 383/8
[58] Field of Search ............... 206/554, 494, 449, 526; 383/8, 9, 903

[56] References Cited

U.S. PATENT DOCUMENTS

| | | | |
|---|---|---|---|
| 3,317,037 | 5/1967 | Russell | 206/554 |
| 3,352,411 | 11/1967 | Schwarzkopf | 206/554 |
| 3,771,645 | 11/1973 | Wendel | 206/554 |
| 4,406,371 | 9/1983 | Membrino | 206/526 |
| 4,476,979 | 10/1984 | Reimann et al. | 383/8 |
| 4,480,750 | 11/1984 | Dancy | 383/8 |

FOREIGN PATENT DOCUMENTS

| | | | |
|---|---|---|---|
| 2803961 | 8/1978 | Fed. Rep. of Germany | 383/8 |
| 1008293 | 10/1975 | United Kingdom | 206/554 |

Primary Examiner—William T. Dixson, Jr.
Assistant Examiner—Brenda J. Ehrhardt
Attorney, Agent, or Firm—Alexander J. McKillop; Michael G. Gilman; James P. O'Sullivan, Sr.

[57] ABSTRACT

A bag pack and individual bags characterized by having handles which are integral extensions of the front and rear of said bag. The bags have a mouth which includes stress relief curves on both sides of an upperly extending tab. The tab includes at least one orifice adapted to securely surround a suspension means. Below or below and above and closely adjacent to said orifice is bonding means fastening all of said bag structures together and simultaneously contributing rigidity to said orifice. Below said bonding means an above the points of maximum amplitude of said stress relief curves is a line of preweakening in said tab to accommodate tear-off of individual bag structures from said pack.

9 Claims, 3 Drawing Figures

THERMOPLASTIC BAG PACK

BACKGROUND OF THE INVENTION

This invention relates to a handled thermoplastic bag pack.

In the recent past, thermoplastic handled grocery sacks have begun to compete with kraft paper grocery sacks, which still dominate the market by a large margin. Thermoplastic grocery sacks have many advantages over the conventional kraft paper grocery sack. Included among these advantages are: superior tear strength, being waterproof, having the convenience of handles, permitting faster loading, having more and better secondary use capabilities, having higher density, etc. It is, therefore, expected that in the future, wider use will be made of such bags.

A conventional manner of providing such handled thermoplastic sacks is to arrange them in a lay-flat stack of 50,100 or more and bond them together by way of an integral tab which extends upwardly from the bag mouth opening. This tab, in addition to providing the site at which the plurality of bags are bonded together, also constitutes the tear-off site of each bag from the bonded tabs. These bonded tabs also provide the site from which the pack of bags can be suspended from some suitable support means. For instance, a peg or flat tongue or similar suspension means may extend through an orifice in the bag tabs. U.S. Pat. No. 4,165,832, issued Aug. 28, 1979, the subject matter of which is, in its entirety, incorporated herein by reference, is an example of the type of thermoplastic grocery sack which forms the subject of the instant invention. In addition, application Ser. No. 548,470, filed Nov. 3, 1983 is directed to the subject of an improved thermoplastic bag pack. The subject matter of this application is, in its entirety, incorporated herein by reference.

Part of the essence of the invention of the above referenced patent application revolves around the employment of an orifice in the bag pack suspension tabs. This orifice served two functions, one, to provide the point of support for some suspending means, such as, a peg or tongue, and the other, as the point of tear-off for individual bags. The orifice was so structured so as to leave comparatively small webs of film between it and the closest point near the bag mouth opening. These small webs provide comparatively small resistence to separating an individual bag from the bag pack assembly.

While such a bag pack assembly generally functions as intended during the support and dispensing of bags during a typical check out procedure in a supermarket, in a certain number of cases, when only a few bags remain in the pack, a problem is encountered. It has been found that as the number of bags in the bag pack decrease, the weight of the bag pack naturally also decreases, and, on attempting to remove a bag from the now-lightweight-pack, the entire pack is pulled from the suspension means. This causes a slow down in the system, requiring the bag pack to be re-hung from the suspending means and two hands to be employed to separate the last few bags from the bag pack.

It is an object of the present invention to present a new and novel bag pack assembly which is not subject to the shortcomings of the prior bag pack.

It is another object of the invention to present a bag pack which can be firmly and securely suspended from a suspension means and which will permit individual bag dispensing down to the last bag in the pack.

SUMMARY OF THE INVENTION

The bag pack of the present invention comprises a plurality of stacked thermoplastic film bag structures, each bag comprising a front and rear bag wall and an open mouth portion, said open mouth portion being characterized by having handles which are integral extensions of said walls, said handles being located at opposite ends of said mouth portion; the superimposed lines defined by both film edges of said bag mouth portion, when the bag is in its lay-flat position, are a series of compound curves including, (a) stress relief curves at opposite ends of said bag mouth, said stress relief curves opening or facing in the direction of the handle end of the bag, and (b) a curve intermediate said stress relief curves generally of the same but opposite amplitude as said stress relief curves; located within the area beneath said (b) curve are : (i) at least one orifice which serves to accommodate secure, physical suspension of said bag pack from a suspension means to be placed within said orifice; (ii) at least one bonding means fastening all of said bags structures together, said bonding means being located at a point below and closely adjacent to said orifice so as to contribute rigidity and reinforcement thereto; and (iii) located below and closely adjacent to said bonding means and above the points of maximum amplitude of said stress relief curves is a line of preweakening in said film, said line of preweakening adapted to accommodate, in cooperation with said orifice and bonding means, tear-off of individual bag structures from said bag pack.

While the bag packs of the present invention may be made of a gussetless structure, with virtually no dimension in the sides of the bag, it is preferred that the sides of the bag be gusseted in order to give a width dimension to the sides of the bag and also to provide a double layer of film in a region of handles.

DETAILED DESCRIPTION OF THE INVENTION

Figure 1:
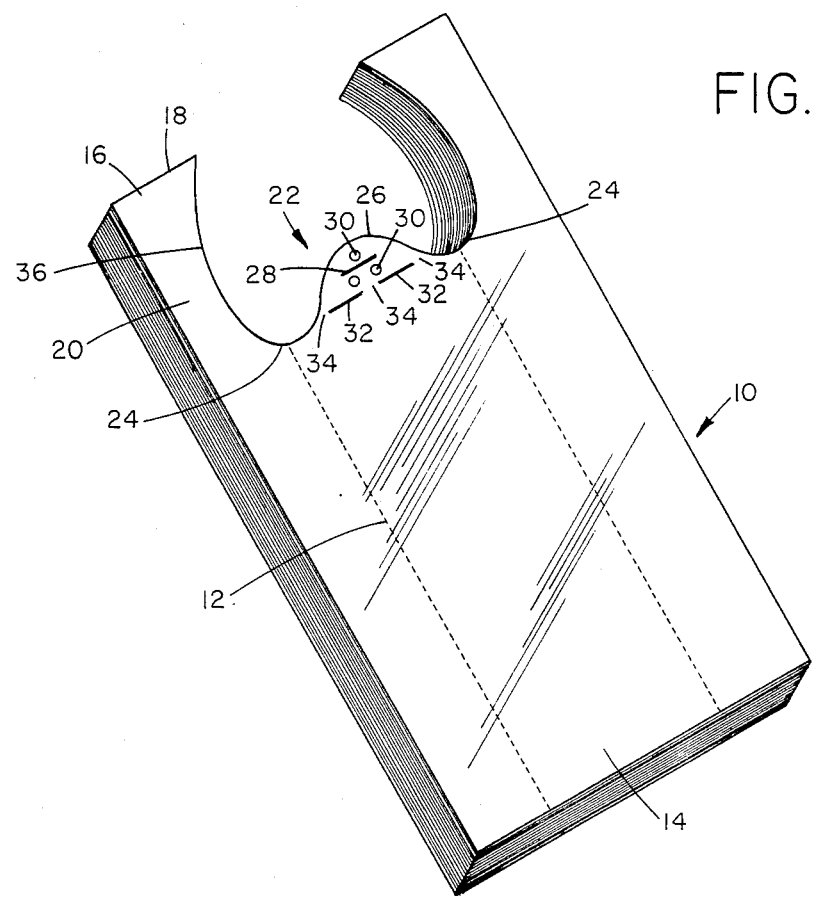
FIG. 1 is a perspective view of a stack of bags of one form of the bag structures of the present invention.

One form of the bag pack and bag structure of the present invention, is shown in FIG. 1 of the accompanying drawing and it generally comprises a pack of handled bags 10. The individual bags are formed from a flattened, side-gusseted thermoplastic tube. The thermoplastic tube can be conveniently made of any thermoplastic film or blends of the same. Typical materials include the polyolefins, e.g., polyethylene, polypropylene, copolymers of ethylene and any other alpha olefin, etc. It is to be understood that the term polyethylene is employed herein in its generic sense so as to include high density polyethylene, low density polyethylene, linear low density copolymers of ethylene and another alpha-olefin, blends of the same, etc. As indicated, the bags are side-gusseted as shown at 12 so as to provide a width dimension to the bags. The side gusset 12 represents a reentrance or infolding of part of a flattened tube in a manner well known to those skilled in the art. The bags have a front panel 14 and an identical back panel, which is not shown in the drawing. The individual bags have handles 16 which are integral extensions of the front and rear panels of the bag. Because the bag structure includes side gussets 12, the handles therefor are composed of double thicknesses of the film of the bag. The individual bags of the bag pack are shown to have handles which are wider at the top 18 then at the base 20 thereof. This feature provides the user with more plastic film in the hand grip region in order to militate against the uncomfortable "roping" tendency in the carrying of a heavily loaded bag. This is an optional feature of the bag handle region. It is to be understood that the handle may be of more or less uniform dimensions from top to bottom since a handle design of this type would save a modicum of thermoplastic film.

The bag mouth opening is generally defined by the superimposed compound curve region 22. This compound curve region is defined by the superimposed lines formed by both film edges of the front and back panels of the bag when the bag is in its lay-flat position. The series of compound curves include (a) stress relief curves 24 at opposite ends of the bag mouth opening and (b) an intermediate curve 26 which is generally the same but of opposite amplitude as the stress relief curves.

Located within the area beneath curve 26 but above the point of maximum amplitude of said stress relief curve 24 are: (i) at least one orifice 28 which serves to accommodate secure, physical suspension of the bag pack from some suspension means to be placed within said orifice; (ii) bonding means 30 fastening all of the bag structures together, said bonding means being located at a point below and preferably below and above and closely adjacent to the orifice 28 so as to contribute rigidity and reinforcement thereto, and (iii) located below and closely adjacent to lower bonding means 30, is a line of preweakening 32 in the film of the intermediate curve region.

The orifice 28 can be of any suitable design or shape complementary to some suspension means placed within the orifice. For example, if the suspension means is a round or cylindrical peg then obviously the orifice would be circular in shape to receive the peg. A preferred suspension means is either a flat tongue-shaped member or a tongue-shaped wire-form member which is adapted to extend through a slit like orifice in the tab, as shown at 28. The dimensions of the slit orifice, which extends all the way through the plurality of stacked bag members, should tightly fit around the suspension means. Since a pack of bags of 50,100 or 150 polyethylene type bags is quite heavy, there is a need to provide some peripheral reinforcement to the pack support orifice 28 so that during use it does not become distorted or enlarged. If it did, this would permit the pack to be pulled free of the support member causing a slow down in bagging time at the supermarket check-out counter. Any suitable bonding means 30 can be employed to accomplish the combined function of effectively securing or bonding all of the bags together in a pack and at the same time providing edge reinforcement to the pack suspension orifice 28. While the bonding means may be only below suspension orifice 28 and still effectively both bond the bags together and reinforce the orifice, it is preferred that the bonding means be above and below the suspension orifice 28.

The preweakened regions 32 are shown in the Figure to be two spaced slits which extend through both layers of all the bags. This arrangement provides three narrow web sections 34 which serve as the tear-off regions for the individual bags of the bag pack. More specifically, the supermarket bagger-clerk would grasp an individual bag somewhere in the body region thereof and with a quick downward or outward pulling motion would sever the bag from the pack at the regions 34. This technique of removal would be repeated for each needed bag until all that remains is the residue of plastic beneath intermediate curve 26. This residue will then be removed from the holding means and discarded and the new bag pack suspended from the suspension means.

In the bag pack depicted in FIG. 1, it will be noted that the inside handle line from the top of the handle to the bottom is gently curved as at 36. This curvature not only saves a small cord-like area of film that is not included in the bag, but also the curve acts in the same manner as stress relief region 24. Because of the curvature of line 36, stress forces which normally would be along a straight edge version of the handle are moved to a significant extent away from this edge. This minimizes any tendency of the handles to tear at nicked or otherwise preweakened regions of the handle.

In the structure illustrated, the individual bags are shown to be bonded together at regions 30. While bonding can be effected by any suitable means, it is preferred to effect it by ultrasonic means. More specifically, by the use of any means which can cause inter-welding of the polymer films, small areas are melt-bonded one to the other throughout the entire thickness of the stack to form a bag pack. One effective means is the Ultrasonic Plastic Welding System, Model No. A-1210C-1080, Sonics and Materials Inc., Danbury, Conn. This device has a head modified to cause small bonds, circular in area throughout the full thickness of the bag pack. This results in the formation of two rough cylinders of fused plastic holding the bags together at regions closely adjacent to the bag suspension orifice. These solid cylinders of plastic also strengthen and reinforce the peripheral region of the support orifice. To create the bonded film pack, the tab region 26 of a stack of the bags, is placed in the system with the ultrasonic target areas being above and below the orifice suspension region. The system is energized and the film of each tab in the target area is ultrasonically heated to fusion temperature. On cooling the bags are unitized by way of the resultant solidified cylinders of plastic.

Figure 2:
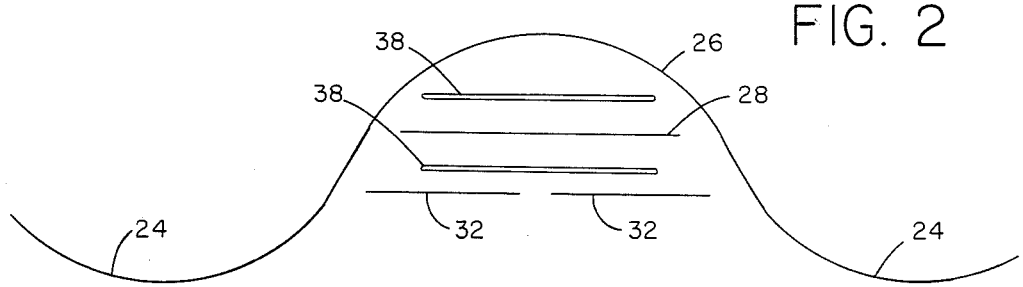
FIG. 2 is a line drawing illustrating an alternative form of the bag mouth opening with its bag pack tab.
Figure 3:
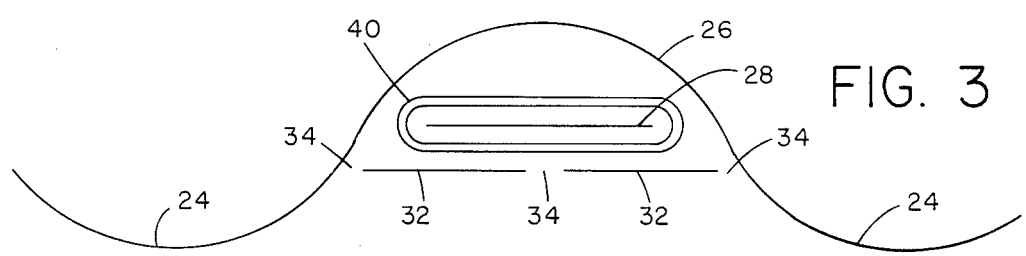
FIG. 3 is another alternative form of the bag mouth opening and its bag pack tab.

FIGS. 2 and 3 of the drawing show two bonding variations adjacent support orifice 28. In FIG. 2, closely adjacent to orifice 28, both above and below thereof is bonding line 38. While these bonding lines can be metal staples or the like, it is again preferred that they be ultrasonically welded regions extending all the way through the bag pack. As indicated this will also prevent distortion of orifice 28 due to the hanging weight of the bag pack. FIG. 3 shows a variation wherein bonding means 40 completely encircles suspension orifice 28, thereby both effectively bonding all bags together and reinforcing the suspension orifice 28.

The bag structures of the present invention may be formed into unitary bag packs by the following process: A thermoplastic tube, for example, of a polyethylene film, is simultaneously flattened and gusseted so that the gussets extend inwardly from the sides to an extent such as is shown, for example, in FIG. 1 at 12. These collapsed and gusseted tubes are, thereafter, sealed and severed at both ends along lines which ultimately constitute the seals at the end of the handle and at the bottom of the bag. These sealed tubes result in the formation of a structure which can be considered as inwardly gusseted, double end-sealed "pillowcases". A plurality of these end sealed "pillowcases" are stacked one upon the other and bonded together as a pack of "pillowcases". This keeps the "pillowcases" in fixed registration. A suitably designed cutting die cuts through the stack, simultaneously forming the bag handles, the bag mouth opening with its included stress relief and intermediate tab areas, and the suspension orifice and preweakened regions of the tab area beneath 26.

It is preferred that the stack bonding occur in two stages. First, a temporary bonding in an area of the "pillowcase" which will be removed by the handle and bag mouth cutting die and, second, in the area which will become the tear off tab of the bag structure. For this first bonding technique reference is made to co-pending application Ser. No. 404,175, filed Aug. 2, 1982. The disclosure of this application is incorporated herein by reference in its entirety. By this technique, as each end sealed "pillowcase" is stacked upon a preceeding "pillowcase", it is sealed thereto in an area to be subsequently removed by the cutting die. As in the aforementioned application, the bonding can be effected by means of heated needles which pierce through adjacent "pillowcases", heat-bonding them together. This technique will maintain the stack of "pillowcases" in accurate registration during movement of the stack to a position where the second permanent bonding will take place. At this position, the stack is permanently bonded together, e.g. ultrasonically, as indicated above, at a location which will be, closely adjacent to the suspension orifice for the bag pack. Thereafter, using suitable means, the handles, bag mouth opening, intermediate tab area, suspension orifice and preweakened tear-off region are formed in the stack.

It is to be understood that the bags described can vary in dimension and materials. There is nothing critical about the gauge dimension of the film employed in the bag. The bag should be capable of carrying the normal supermarket bag load which can range anywhere from a few pounds to about 35 pounds.

What is claimed is:

1. A bag pack comprising a plurality of stacked thermoplastic film bag structures, each bag comprising a front and rear bag wall and an open mouth portion, said open mouth portion being characterized by having handles which are integral extensions of said walls, said handles being located at opposite ends of said mouth portion; the superimposed lines defined by both film edges of said bag mouth portion when the bag is in its lay-flat position are a series of compound curves including (a) stress relief curves at opposite ends of said bag mouth, said stress relief curves opening or facing in the direction of the handle end of the bag and (b) a curve intermediate said stress relief curves, said curve being generally of the same but opposite amplitude of said stress relief curves; located within the area beneath said (b) curve are: (i) at least one orifice to accommodate physical suspension of said bag pack from a suspension means to be placed within said orifice, said orifice being of the type which in the absence of reinforcement tends to distort or enlarge under the weight of the bag pack; (ii) at least one melt-bonded means fastening all of said bags structures together, said melt-bonded means being located at a point below and closely adjacent to said orifice providing rigidity and reinforcement thereto; and (iii) located below and closely adjacent to said melt-bonded means and above the point of maximum amplitude of said stress relief curves a line of preweakening in said film, said line of preweakening adapted to accommodate, in cooperation with said orifice and bonding means, tear-off of individual bags structure from said bag pack.

2. The bag pack of claim 1 wherein the individual bag structures have gusseted side walls.

3. The bag pack of claim 2 wherein said melt-bonded means is located below and above and closely adjacent to said orifice.

4. The bag pack of claim 3 wherein said orifice is an elongated slot.

5. The bag pack of claim 3 wherein said line of preweakening is two or more spaced in-line severences extending through each layer of film and providing between said severance lines and between said bag mouth opening and said severance lines, narrow webs of film adapted for easy severance of each bag from said bag pack.

6. The bag pack of claim 3 wherein said bags are bonded together by an inter-welding of said film at said adjacent area.

7. The bag pack of claim 6 wherein said bond is an ultrasonically fused bond.

8. The bag pack of claim 1 wherein said handles are wider at the top than at the region of the stress relief curves and the lines corresponding to the inside edges of said handles, from the top of the handles through the region of the stress relief curves, are also gently curved to meet such stress relief curves 9. A bag as separated from the bag pack of claim 8.

* * * * *